US012741824B2

(12) United States Patent
Baba

(10) Patent No.: US 12,741,824 B2
(45) Date of Patent: Sep. 22, 2026

(54) TIP ALIGNMENT DEVICE

(71) Applicant: Hitachi High-Tech Corporation, Tokyo (JP)

(72) Inventor: Issei Baba, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 72 days.

(21) Appl. No.: 18/855,770

(22) PCT Filed: Mar. 3, 2023

(86) PCT No.: PCT/JP2023/008031
§ 371 (c)(1),
(2) Date: Oct. 10, 2024

(87) PCT Pub. No.: WO2023/199640
PCT Pub. Date: Oct. 19, 2023

(65) Prior Publication Data

US 2025/0229995 A1 Jul. 17, 2025

(30) Foreign Application Priority Data

Apr. 11, 2022 (JP) ................................ 2022-065083

(51) Int. Cl.
*B65G 47/14* (2006.01)

(52) U.S. Cl.
CPC ................................ *B65G 47/1471* (2013.01)

(58) Field of Classification Search
CPC ... B65G 47/1471; B01L 2200/18; B01L 9/54; B01L 2200/025; G01N 2035/103; G01N 35/04
See application file for complete search history.

(56) References Cited

U.S. PATENT DOCUMENTS 6,182,719 B1 * 2/2001 Yahiro ............... G01N 35/1074 422/526
6,875,401 B1 4/2005 Suzuki et al.
9,050,598 B2 * 6/2015 Tsukioka ................ B01L 9/543
(Continued)

FOREIGN PATENT DOCUMENTS

DE 102015014275 A1 * 5/2017 ......... B65G 21/2072
JP 10-329930 A 12/1998
(Continued)

OTHER PUBLICATIONS

IPSearch History Apr. 30, 2026 UTC; InnovationQ+; https://iq.ip.com/discover (Year: 2026).*
(Continued)

*Primary Examiner* — Gene O Crawford
*Assistant Examiner* — Abby A Jorgensen
(74) *Attorney, Agent, or Firm* — Crowell & Moring LLP

(57) ABSTRACT

During tip transportation, due to friction between tips and other components or differences in level during delivery, the tips may be caught and the transportation may stop. To solve this problem, a pipette tip alignment device is provided with a supply unit that supplies loaded tips. The supply unit includes two plates, a rail that is disposed at the leading end of the plates and supports the tips, and a rotating body that supplies the tips to the rail provided with grooves for storing the tips, wherein the plates are driven to widen the rail.

9 Claims, 11 Drawing Sheets

(56) References Cited

U.S. PATENT DOCUMENTS

| | | | | |
|---|---|---|---|---|
| 2003/0026733 | A1* | 2/2003 | LaCourt | G01N 35/025<br>422/63 |
| 2004/0031809 | A1* | 2/2004 | Itoh | B01L 9/543<br>221/208 |
| 2015/0044111 | A1* | 2/2015 | Peetz | G01N 35/1074<br>422/511 |
| 2020/0355717 | A1* | 11/2020 | Izume | B01L 3/0227 |

FOREIGN PATENT DOCUMENTS

| | | | | | |
|---|---|---|---|---|---|
| JP | 2004-77473 | A | | 3/2004 | |
| JP | 2004077473 | A | * | 3/2004 | B01L 9/543 |
| JP | 2007145596 | A | * | 6/2007 | B65G 47/1492 |
| JP | 2014-47039 | A | | 3/2014 | |
| JP | 2016-98079 | A | | 5/2016 | |
| JP | 2016098079 | A | * | 5/2016 | |

OTHER PUBLICATIONS

International Search Report (PCT/ISA/210) issued in PCT Application No. PCT/JP2023/008031 dated May 16, 2023, with English translation (4 pages).

Japanese-language Written Opinion (PCT/ISA/237) issued in PCT Application No. PCT/JP2023/008031 dated May 16, 2023, with English translation (7 pages).

* cited by examiner

[FIG. 1]
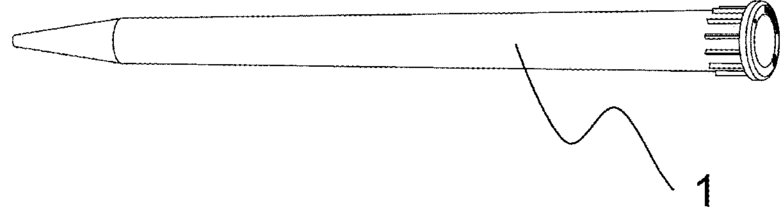

[FIG. 2]
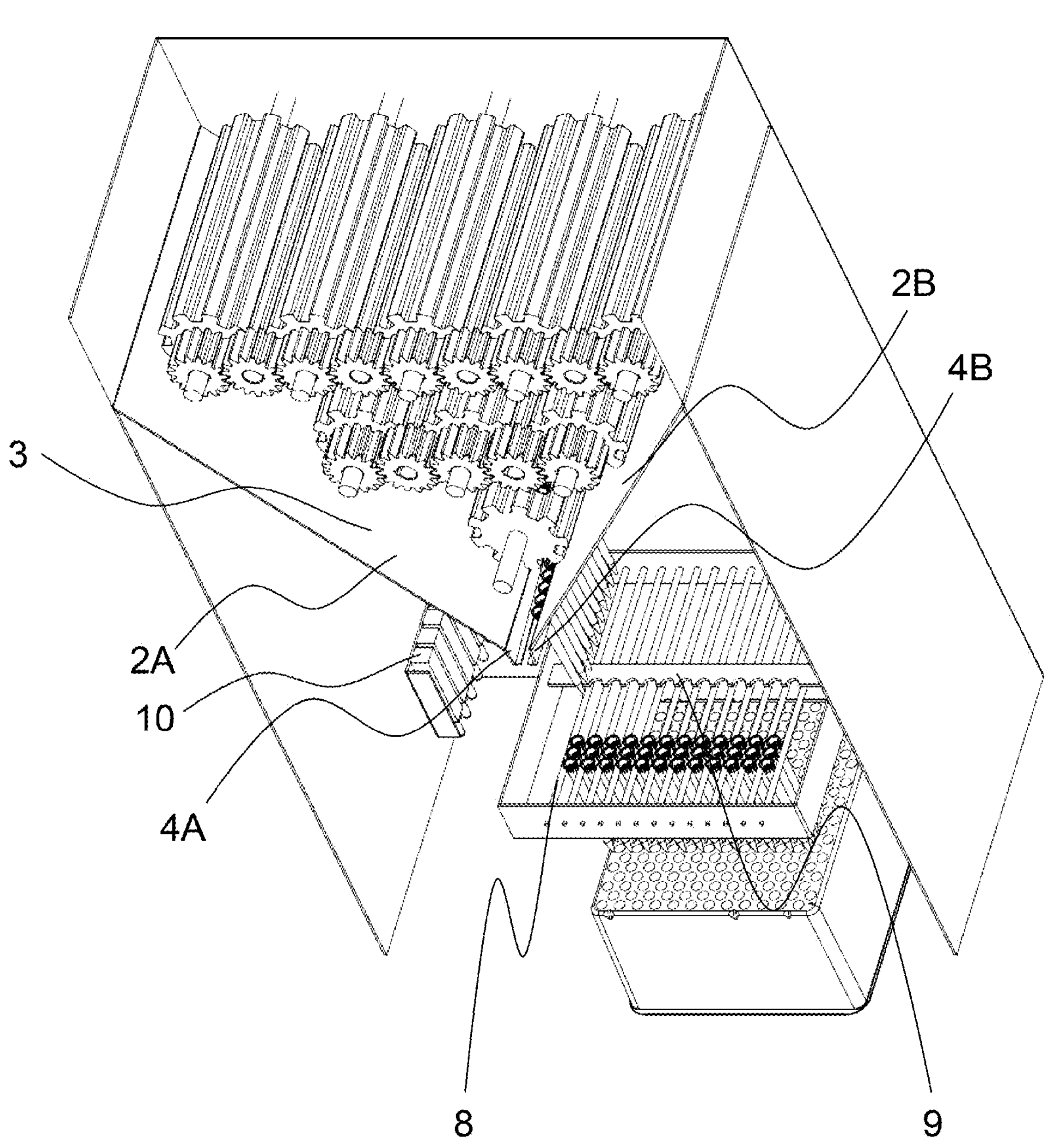

[FIG. 3]
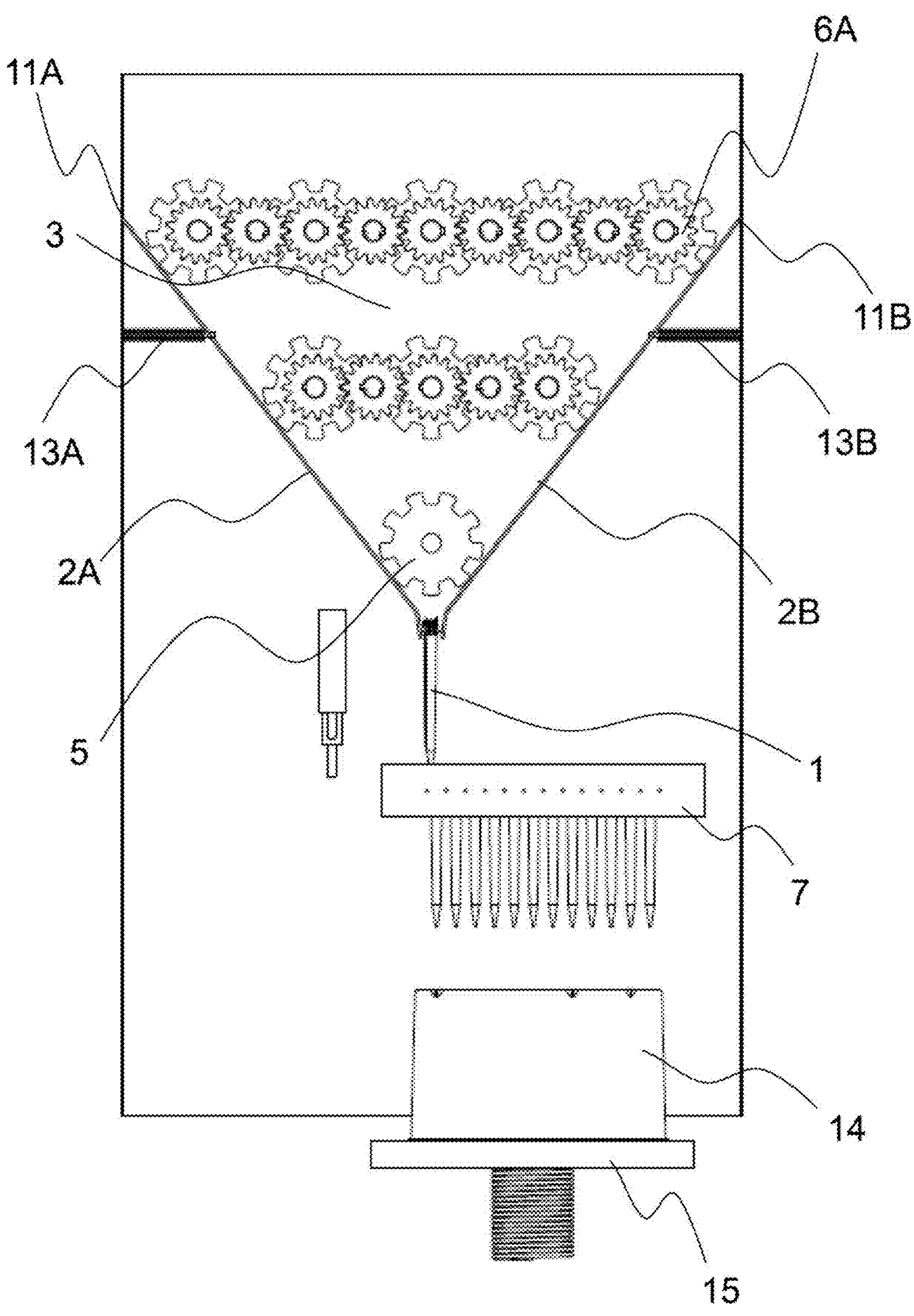

[FIG. 4]
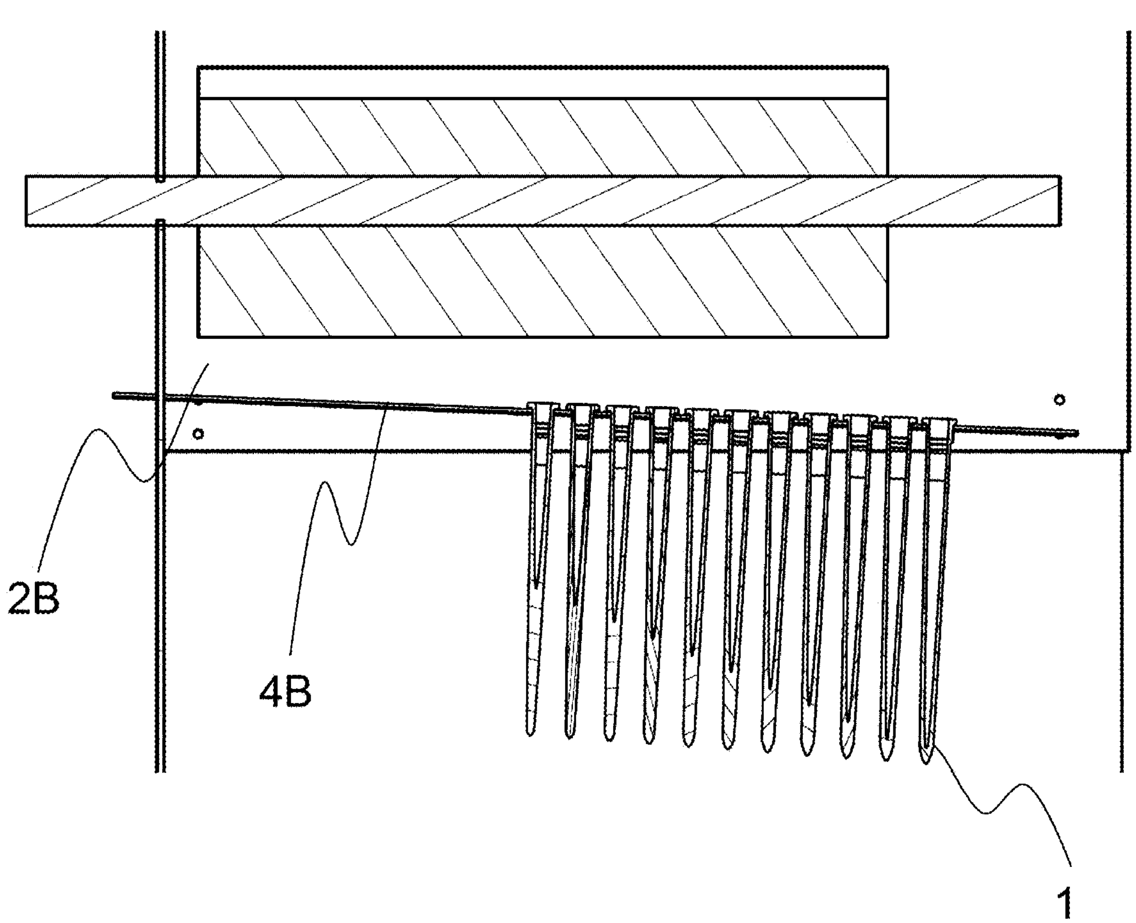

[FIG. 5]
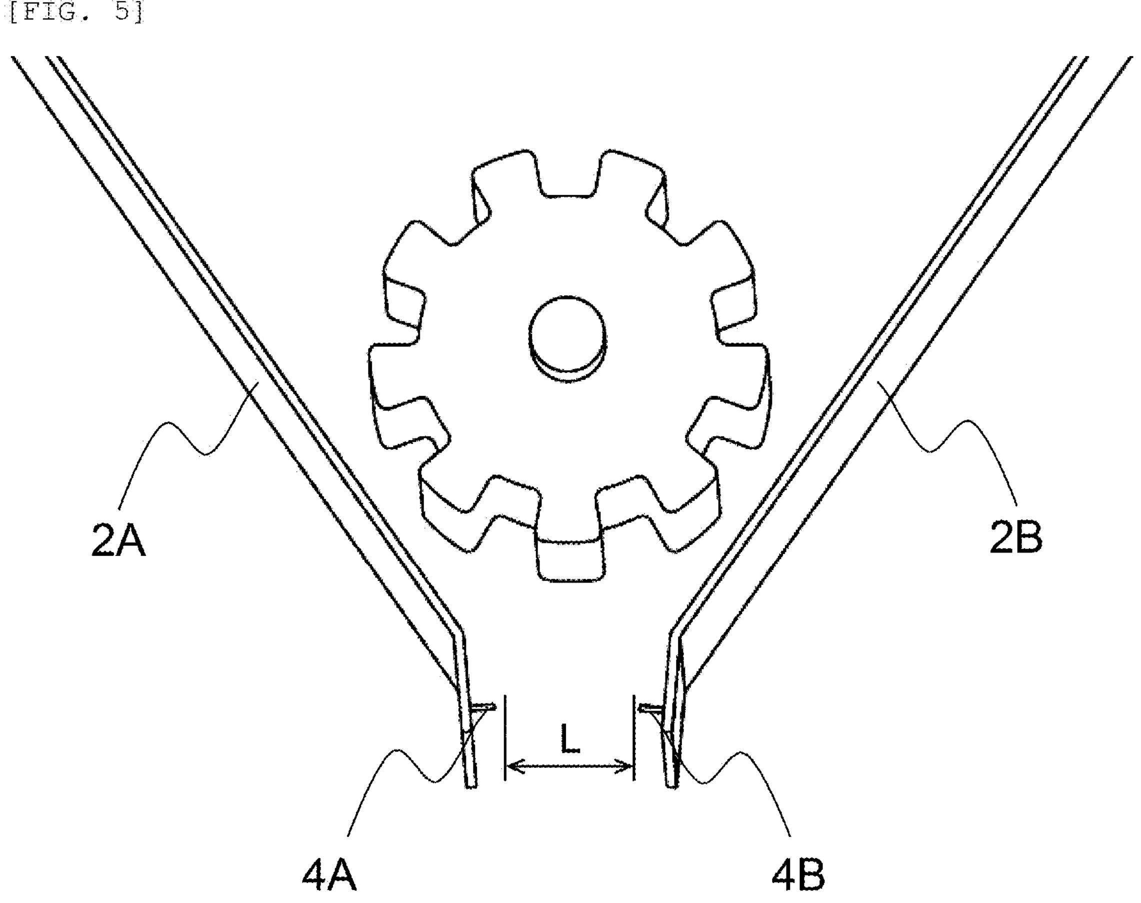

[FIG. 6]
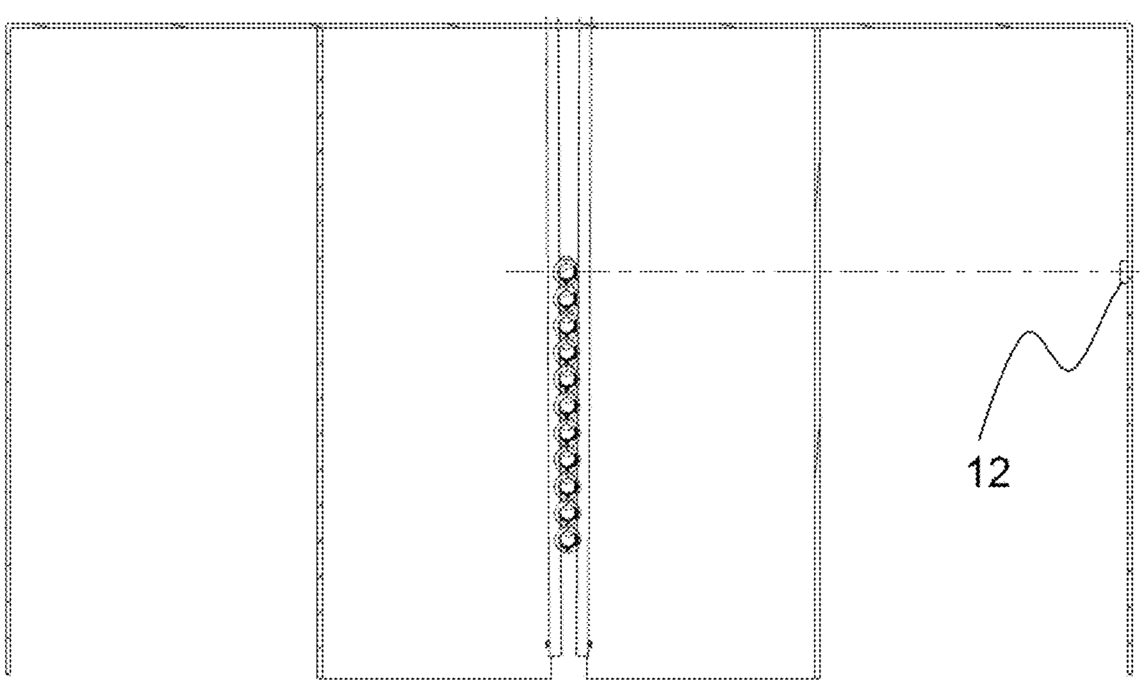

[FIG. 7]
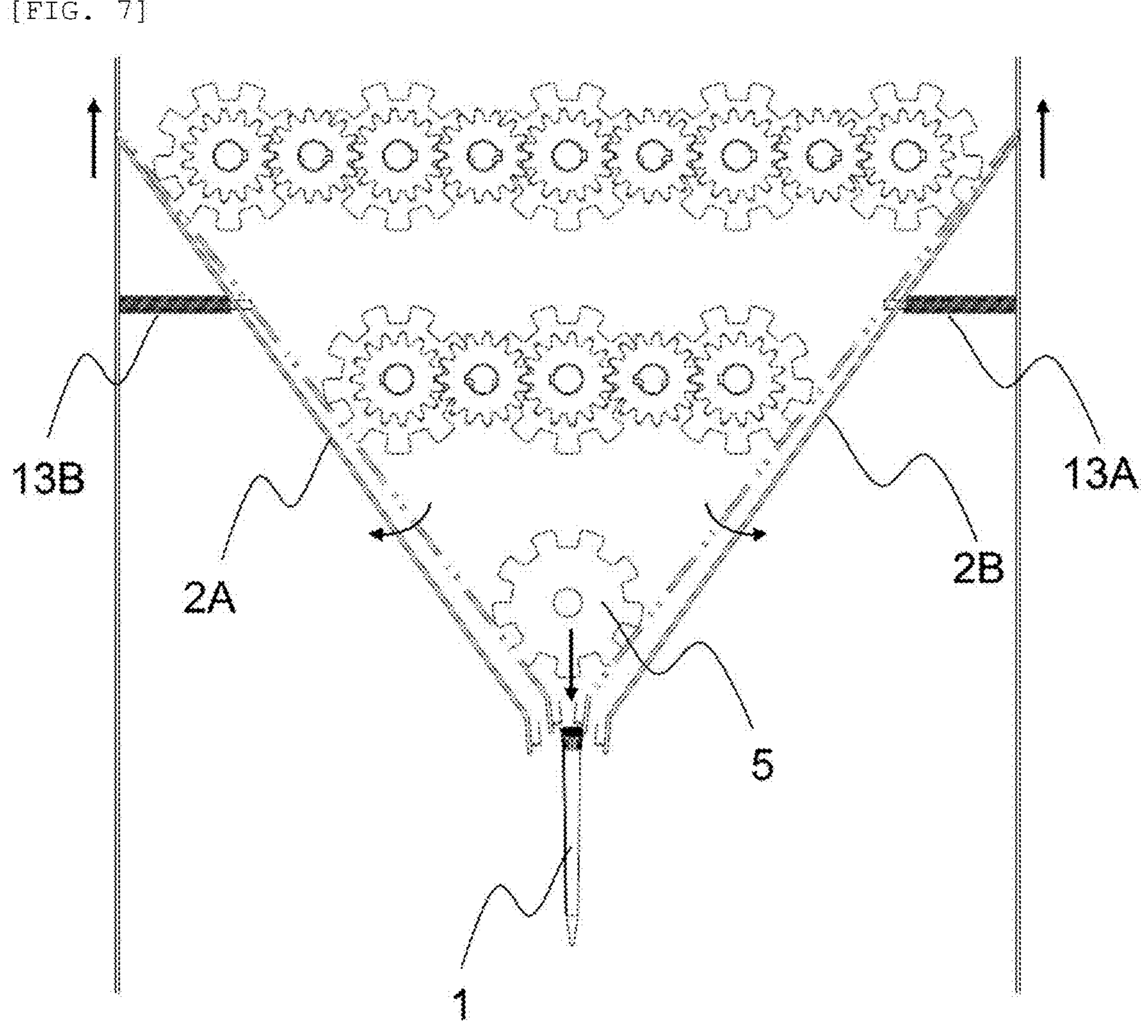

[FIG. 8]
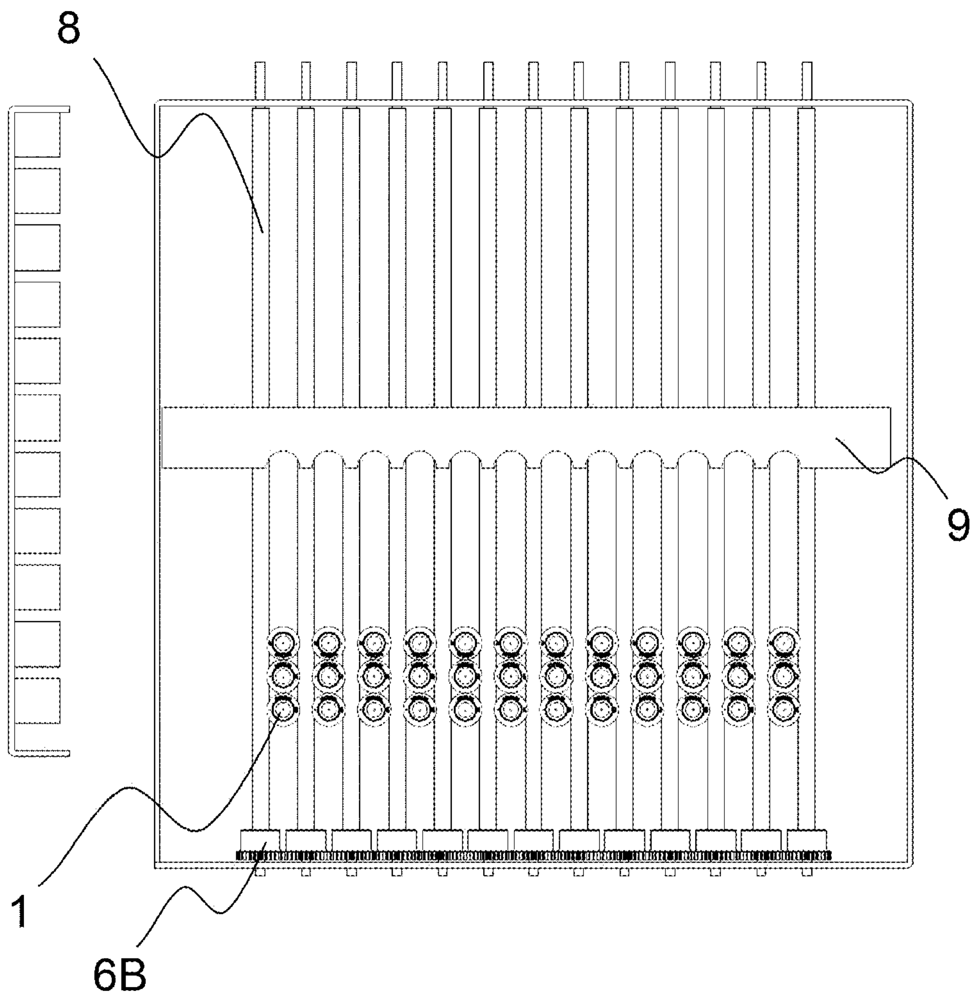

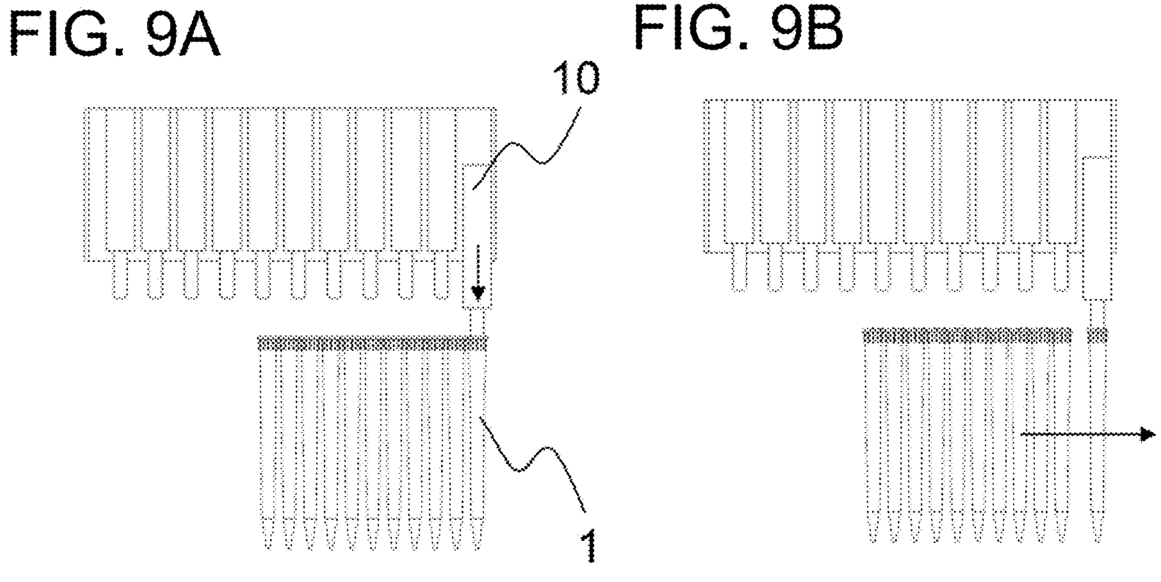
FIG. 9A
10
1
FIG. 9B
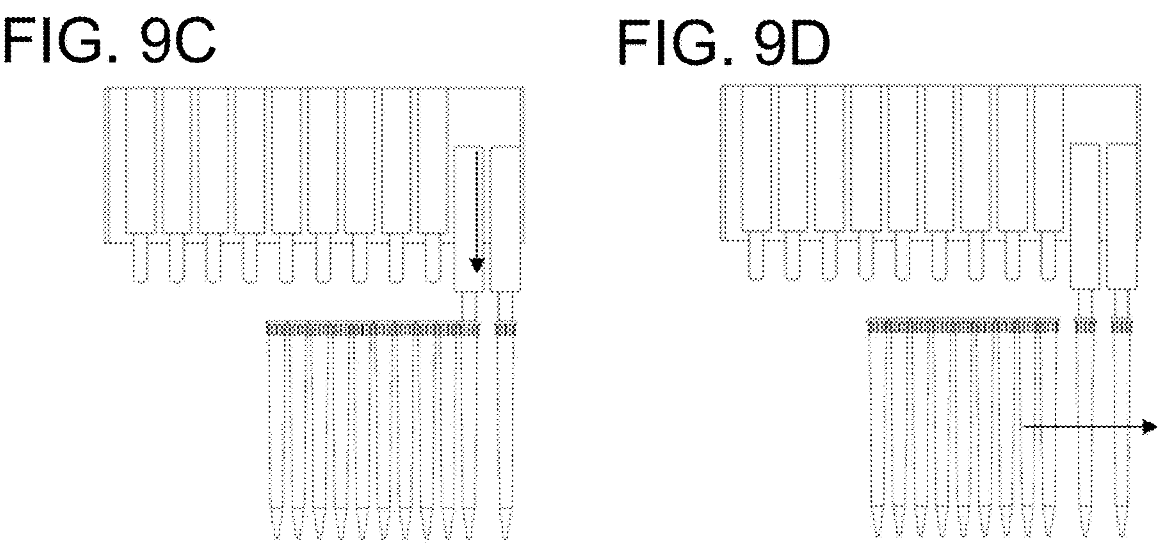
FIG. 9C
FIG. 9D

[FIG. 10]
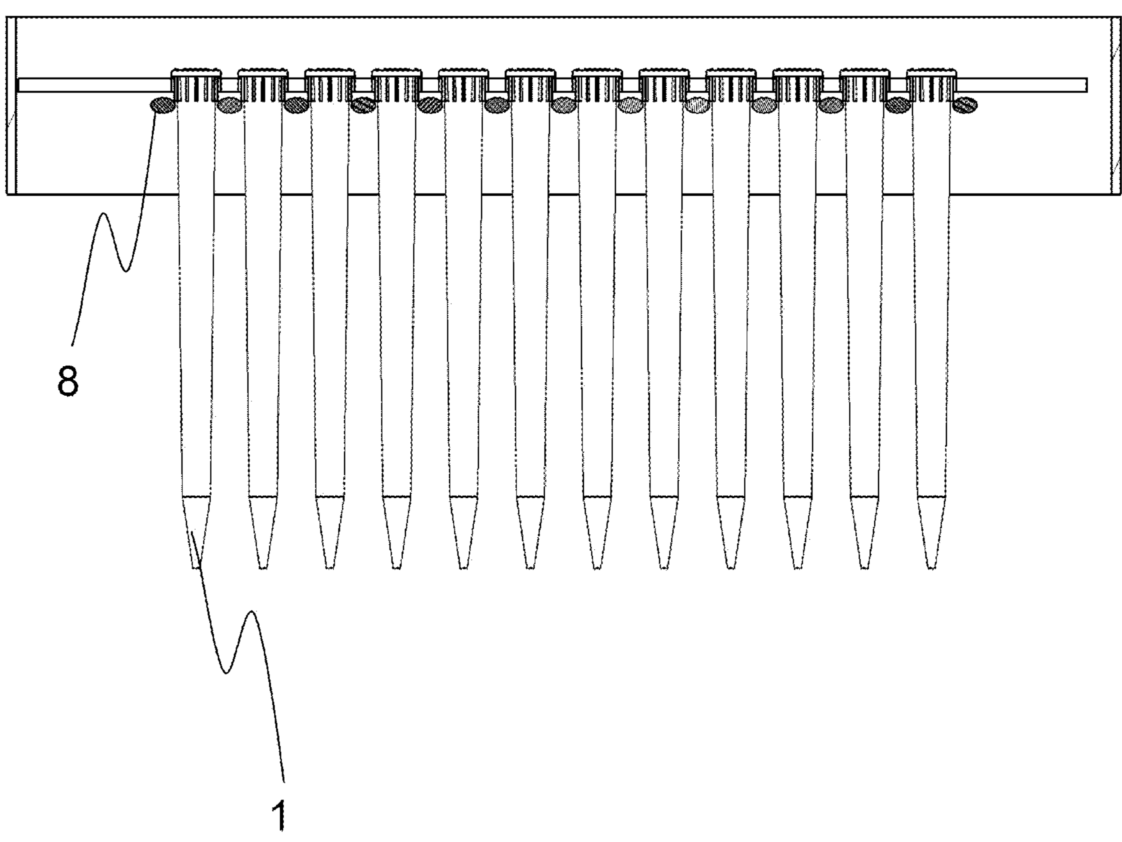

[FIG. 11]
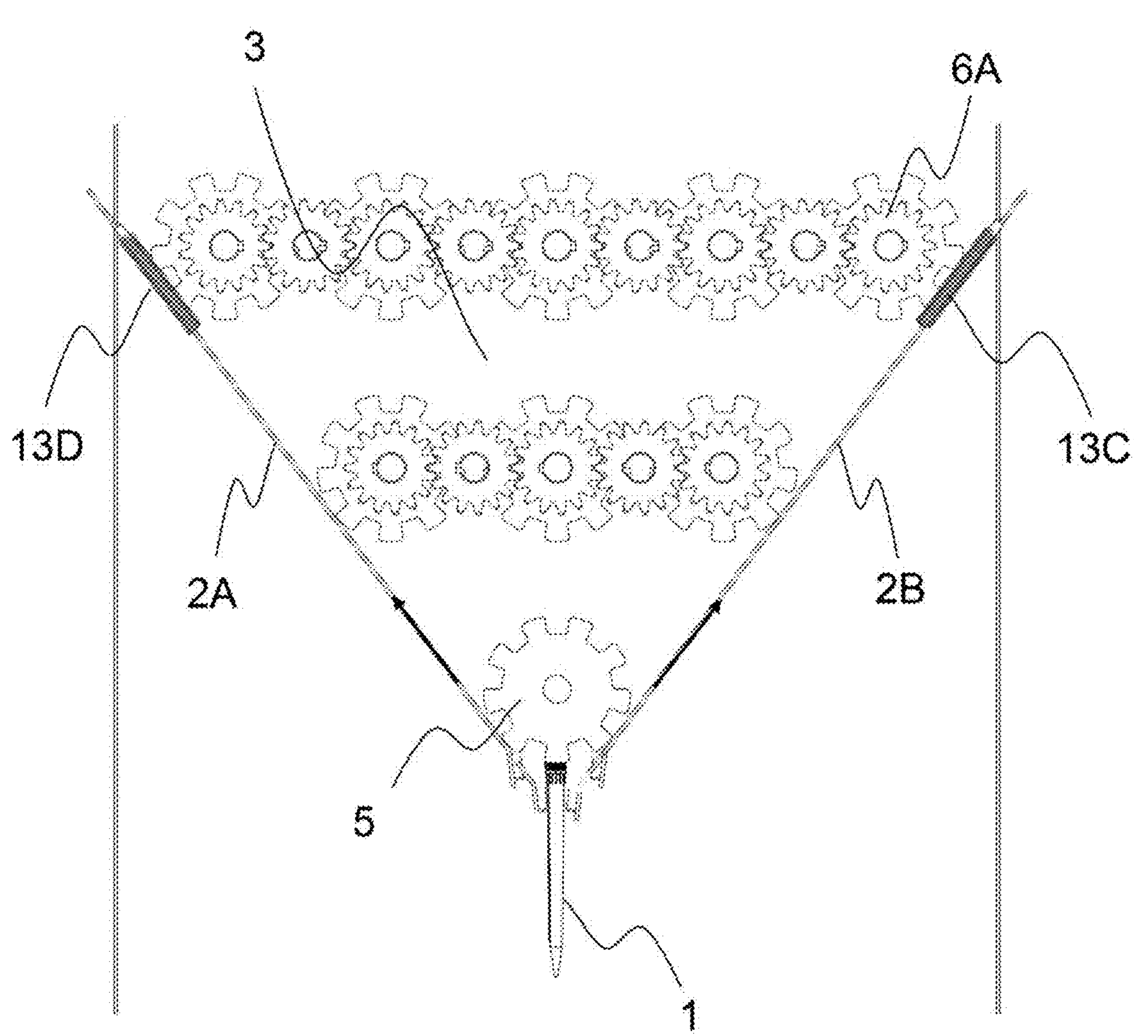

TIP ALIGNMENT DEVICE

TECHNICAL FIELD

The present invention relates to a tip alignment device.

BACKGROUND ART

PTL 1 describes an automatic tip insertion device that inserts a tip into an insertion unit of a rack. In PTL 1, it is disclosed that "including: a moving mechanism provided with a hopper that discharges tips and a separation mechanism that receives the tips, moves the tips to a predetermined position, and separates the tips into individual ones; an endless circulation unit that transports one of the tips at a time while aligning the tip into a posture in which a leading end 2*b* faces downward; an indexing mechanism that includes a comb-shaped member, that receives base portions of the tips supplied from one end of a transportation path, and can move the comb-shaped member one pitch at a time in a perpendicular direction; and a moving mechanism that suspends a plurality of the tips supported by the comb-shaped member, moves the tips above the rack, and collectively loads the tips into the insertion unit provided on the rack".

CITATION LIST

Patent Literature

PTL 1: JPH10-329930A

SUMMARY OF INVENTION

Technical Problem

PTL 1 describes the moving mechanism that moves the tips to a predetermined position. However, the moving mechanism described in PTL 1 causes a diagonally arranged member having a semicircular cross section to slip, and transports the tips to the predetermined position by a frictional force of an endless circulation belt. Therefore, the tips are transported by a fixed distance while in contact with other components, so that the tips may be caught and the transportation may stop due to friction between the tips and the other components or differences in level during delivery.

An object of the invention is to provide a tip alignment device in which a risk of stop of transportation due to catching of tips is reduced.

Solution to Problem

To solve the above problems, one representative tip alignment device according to the invention includes a supply unit configured to supply loaded tips. The supply unit includes two plates, rails that are provided at leading ends of the respective plates and support the tips, and a rotating body that is provided with grooves for storing the tips and supplies the tips to the rails, and the plates are driven to widen a width between the rails.

Advantageous Effects of Invention

According to the invention having a configuration including a tip discharge mechanism in which tips are held by plates that are built into a tip supply unit and include rails at leading ends, and the tips are released by an operation of the plates, a tip alignment device in which a risk of stop of transportation due to catching of the tips is reduced can be provided. Problems, configurations, and effects other than those described above clarified are by the following descriptions of embodiments.

BRIEF DESCRIPTION OF DRAWINGS

FIG. 1 is a perspective view illustrating a tip that is an aligned member according to the invention.

FIG. 2 is a schematic perspective view illustrating a whole tip alignment device according to the invention.

FIG. 3 is a schematic front view illustrating the whole tip alignment device according to the invention.

FIG. 4 is a side view illustrating a cross section of a rotating body and a rail that supports the tips according to the invention.

FIG. 5 is a front view illustrating the rotating body and the rails that support the tips according to the invention.

FIG. 6 is a plan view illustrating a cross section of plates, rails, and a beam sensor according to the invention.

FIG. 7 is a front view illustrating an operation state of a tip alignment device according to a first embodiment.

FIG. 8 is a plan view illustrating an alignment unit for the tips according to the first embodiment.

FIG. 9A to FIG. 9D are side views illustrating an operation state of rods, by which the tips are aligned in a grid pattern, in the alignment unit for the tips according to the first embodiment.

FIG. 10 is a front view illustrating a cross section of pillars in the alignment unit for the tips according to the first embodiment.

FIG. 11 is a front view illustrating an operation state of a tip alignment device according to a second embodiment.

DESCRIPTION OF EMBODIMENTS

Hereinafter, embodiments of the invention will be described in order with reference to the drawings.

Embodiment 1

Hereinafter, an embodiment of the invention will be described with reference to the accompanying drawings. In the following description and the accompanying drawings, components having the same functional configuration are denoted by the same reference numerals, and redundant description thereof will be omitted.

FIG. 1 is a perspective view illustrating a tip 1 that is an aligned member according to the present embodiment, FIG. 2 is a schematic perspective view illustrating a whole tip alignment device, on which the aligned members are mounted, according to the present embodiment, and FIG. 3 is a schematic front view illustrating the whole tip alignment device, on which the aligned members are mounted, according to the present embodiment. The tip alignment device according to the present embodiment includes a supply unit 3, an alignment unit 7, and a table 15 on which a magazine 14 is set, and the tips 1 loaded into the tip alignment device are automatically stored in the magazine 14. The supply unit is provided with a rotating body, which drops the tips 1 one by one, and plates. Orientations of a plurality of tips 1 loaded from an upper portion of the tip alignment device are unified in a fixed direction by the rotating body. The tips 1 dropped from the rotating body each are supported by plates 2A and 2B including rails 4A and 4B and elastic members 13A and 13B, and are collectively discharged to the alignment unit 7.

The alignment unit 7 includes pillars, an alignment member, and rods, and the tips 1 discharged from the supply unit are supported by pillars 8 in the alignment unit 7. In a state in which the tips are supported by the pillars 8, the tips are aligned, by an alignment member 9 and rods 10, in a grid pattern to correspond to tip insertion positions of the magazine 14. The table 15 on which the magazine 14 is placed is raised, the tips 1 are inserted into the magazine 14, and the tips 1 are released from the alignment unit 7, thereby storing the tips 1 in the magazine 14. A configuration of the tip alignment device according to the present embodiment will be described in detail with reference to FIGS. 3 to 11.

As illustrated in FIG. 1, the tip 1 has a tapered shape in which diameters at both ends are different. By rotating the rotating body 5 in FIG. 3 having grooves, a plurality of tips, which are loaded from the upper portion of the device and whose orientations are not unified, are stored in the grooves and dropped from the rotating body 5, and thus the orientations of the tips 1 are unified to a fixed direction.

In order to efficiently align the plurality of tips whose orientations are not unified, it is preferable to provide combinations of a plurality of rotating bodies 5 in multiple stages. When a plurality of rotating bodies are combined, the plurality of rotating bodies are coupled by a power transmission member 6A, and the rotating bodies can be rotated forward and backward in conjunction with the power transmission member, so that the plurality of tips piled up in the supply unit can be aligned uniformly without being biased in a fixed direction. It is possible to provide a drive unit for each rotating body, but the plurality of rotating bodies can be driven by one power source by using the power transmission member, and therefore, the device can be simplified and made lighter. Specifically, the power transmission member 6A may be a member in which gears as illustrated in the drawing are coupled, or a pulley may be provided on each rotating body, and the pulley may be driven by a belt. Any means may be used as long as the plurality of rotating bodies can be driven by one power source.

FIG. 4 is a side view illustrating a cross section of the tips that are supported by the rails and slip on the rails, FIG. 5 is a front view illustrating the rotating body and the rails supporting the tips illustrated in FIG. 3, and FIG. 6 is a plan view illustrating a cross section of the plates and the rails illustrated in FIG. 3 and a beam sensor 12.

The tips 1 aligned and discharged by the rotating body are supported by the rails 4A and 4B provided at leading ends of the two plates 2A and 2B. At this time, an interval between the rails is set to be larger than a diameter of one end of the tip and smaller than a diameter of the other end of the tip, and thus the dropped tips are unified such that an end surface having a larger diameter is an upper side and an end surface having a smaller diameter is a lower side. The rails 4A and 4B are inclined, and the tips that fall onto the rails slip on the rails in a fixed direction. It is preferable that a sensor is provided on the rails to control the number of tips that fall onto the rails. For example, a beam sensor is provided on a tip transportation path on the rails such that a beam passes in a direction perpendicular to a transportation direction, and detects whether the tip is normally discharged from the rotating body. When the sensor detects the tip after the rotating body is driven, it is determined that the tip is discharged normally, and the number of discharged tips can be controlled by stopping driving the rotating body. When it is detected that a predetermined number of tips are held on the rail, the tips are dropped from the supply unit to the alignment unit.

In the present embodiment, the plates 2A and 2B are assembled to the device by hinges 11A and 11B, and are rotatably fixed about the hinges respectively. A sliding unit (not shown) that slides the rotating body in an upper-lower direction is provided. The rotating body that slides in the upper-lower direction is required to be a single rotating body that can be in contact with both the plates 2A and 2B when sliding.

As illustrated in FIG. 7, when a predetermined number of tips are detected on the rails, the rotating body and the plates relatively slide in the upper-lower direction and the two plates are pressed by the rotating body, causing the plates to rotate about the hinges respectively and a distance L between the rails in FIG. 5 to be larger than the diameter of the tip, so that the tips are released from the rails and dropped into the alignment unit. Specifically, the rotating body slides downward and presses the two plates, or the two plates slide upward and are pressed by the rotating body. The tips mainly fall from top to bottom from when the tips are loaded to when the tips are released from the rails, and a distance that the tips slip on the rails is short, and therefore, a risk of stop of transportation due to catching of the tips on other components is low. Further, since the plurality of tips can be released simply by relative sliding between the rotating body and the two plates in the upper-lower direction, no complex mechanism is required, and the device can be simplified. The plates from which the tips are released return to positions before the rotation by the elastic members.

FIG. 8 is a plan view illustrating the alignment unit for the tips illustrated in FIG. 3. In the alignment unit, a plurality of pillars are arranged in parallel at equal intervals, and spaces for supporting the dropped tips are formed between the pillars. In the spaces formed between the pillars 8, the plurality of tips are supported at unequal intervals in an axial direction of the pillars, and are pushed in a fixed direction by the alignment member. Since the plurality of tips are supported by the pillars while being in contact with each other in the axial direction of the pillars, the tips can be aligned while being concentrated in a fixed direction.

FIG. 9 is a side view illustrating an operation state of rods, by which the tips are aligned in the grid pattern, in the alignment unit for the tips illustrated in FIG. 3. The plurality of tips are aligned at fixed intervals in the axial direction of the pillars by repeating an operation of inserting the rods, which are arranged at equal intervals and slide up and down, into respective tips among adjacent tips and sliding the tips in the axial direction of the pillars. Since the plurality of tips are aligned in the grid pattern by the alignment unit by performing the above operation for each row of the tips, the plurality of tips can be stored in the magazine at one time.

The table on which the magazine is placed is raised towards the tips aligned in the grid pattern, the tips are stored in holes of the magazine for fixed lengths, the pillars that support the tips are rotated, and the tips are released, dropped, and stored in the magazine. Thus, the tips can be supported and released simply by rotation motion, and the tips aligned in the grid pattern can be released at one time. At this time, the pillars are each required to have a cross-sectional shape as illustrated in FIG. 10 in which a distance between the pillars is changed by the rotation or have a rotation axis. Since the plurality of pillars 8 are coupled by the power transmission member 6B, and are rotatable in conjunction with the power transmission member 6B, the device can be simplified and made lighter.

The table on which the magazine, in which the storage of the tips is completed, is placed is lowered and conveyed to a position for an operator to take out the magazine. Even in a case where it is not necessary to store the tips in the magazine, since the tips can be supplied to the alignment unit and the tips can be aligned in the alignment unit, once the magazine is provided in the device, the tips can be stored in the magazine immediately.

Although a case in which the rotating body is driven in the upper-lower direction has been described above as an example, it is sufficient that the rotating body and the plates are relatively driven in the upper-lower direction and the plates can be pressed by the rotating body. The plates may be fixed to a slidable plate provided in the device by hinges and slid in the upper-lower direction with respect to the rotating body which is fixed.

Embodiment 2

Next, a tip alignment device according to a second embodiment will be described with reference to FIG. 11. In FIG. 11, since the same reference numerals as those in FIG. 3 denote the same components, repeated descriptions are omitted. In the first embodiment, a means is used in which two plates rotate about the hinges when the tips are released in the supply unit. However, in the second embodiment, the tips are released by the two plates sliding parallel to respective plate surfaces thereof, which is a difference as compared with the first embodiment. The second embodiment is the same as the first embodiment in that the distance between the rails is changed by driving the two plates, thereby enabling the release of the tips. In addition, operations other than a tip releasing operation are also the same as those in the first embodiment.

The plates from which the tips are released by sliding return to the positions before the rotation by elastic members 13C and 13D. Since the plurality of tips can be released simply by linear motion of the plates, no complex mechanism is required, and the device can be simplified.

The invention is not limited to the above embodiments, and includes various modifications. For example, the above embodiments have been described in detail to facilitate understanding of the invention, and the invention is not necessarily limited to those including all the configurations described above. A part of a configuration of a certain embodiment can be replaced with a configuration of another embodiment, and the configuration of another embodiment can be added to the configuration of a certain embodiment. A part of a configuration according to each embodiment may be added to, deleted from, or replaced with another configuration.

REFERENCE SIGNS LIST

1: tip
2A, 2B: plate
3: supply unit
4A, 4B: rail
5: rotating body
6A, 6B: power transmission member
7: alignment unit
8: pillar
9: alignment member
10: rod
11A 11B: hinge
12: sensor
13A, 13B, 13C, 13D: elastic member
14: magazine
15: table

The invention claimed is:

1. A tip alignment device comprising:
a supply unit configured to supply loaded tips, wherein the supply unit includes two plates, rails that are provided at leading ends of the respective plates and support the tips, and a rotating body that is provided with grooves for storing the tips and supplies the tips to the rails, and the plates are driven to widen a width between the rails; and
the plates are rotatably fixed, and the plates are rotated to widen the width between the rails by relatively moving the rotating body and the plates and pressing the plates by the rotating body.

2. The tip alignment device according to claim 1, wherein a plurality of the rotating bodies are provided, and the rotating bodies are arranged in multiple stages.

3. The tip alignment device according to claim 2, wherein the rotating bodies are coupled by a power transmission member and are rotated forward and backward in conjunction with the power transmission member.

4. The tip alignment device according to claim 1, wherein the rails are inclined and include a means allowing the tips discharged from the supply unit to slip in one direction.

5. The tip alignment device according to claim 1, wherein the tips supplied from the supply unit are supported by an alignment unit, the alignment unit includes a plurality of pillars, and the tips are released and dropped by rotation of the pillars.

6. The tip alignment device according to claim 5, wherein the pillars are coupled by a power transmission member and are rotated in conjunction with the power transmission member.

7. The tip alignment device according to claim 5, wherein the tips supported by the alignment unit are pushed in a fixed direction by an alignment member and are aligned to be in contact with each other.

8. The tip alignment device according to claim 7, wherein a plurality of the tips which are adjacent are aligned in a grid pattern by inserting a plurality of rods arranged at fixed intervals into the tips or inserting the rods between the tips.

9. The tip alignment device according to claim 5, wherein the pillars have a cross-sectional shape in which a distance between the pillars is changed by rotation or have a rotation axis.

* * * * *